US011788459B2

(12) United States Patent
Inoue et al.

(10) Patent No.: US 11,788,459 B2
(45) Date of Patent: Oct. 17, 2023

(54) FORCED-INDUCTION DEVICE

(71) Applicant: TOYOTA JIDOSHA KABUSHIKI KAISHA, Toyota (JP)

(72) Inventors: Yasuko Inoue, Toyota (JP); Takashi Tsukiyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/168,671

(22) Filed: Feb. 14, 2023

(65) Prior Publication Data

US 2023/0287830 A1 Sep. 14, 2023

(30) Foreign Application Priority Data

Mar. 9, 2022 (JP) ................................ 2022-036093

(51) Int. Cl.
*F02B 37/02* (2006.01)
*F02B 75/20* (2006.01)
*F02B 75/08* (2006.01)
*F02B 75/18* (2006.01)

(52) U.S. Cl.
CPC ............ *F02B 37/025* (2013.01); *F02B 75/20* (2013.01); *F02B 2075/1816* (2013.01)

(58) Field of Classification Search
CPC ..................................................... F02B 37/025
See application file for complete search history.

(56) References Cited

FOREIGN PATENT DOCUMENTS

| | | | | |
|---|---|---|---|---|
| DE | 112015001237 B4 * | 6/2021 | ............. | F01D 25/24 |
| JP | 2-42136 A | 2/1990 | | |
| JP | H0242136 A * | 2/1990 | | |
| JP | 2021-134719 A | 9/2021 | | |
| WO | WO-2012034347 A1 * | 3/2012 | ............. | F01D 9/026 |

OTHER PUBLICATIONS

"What Is Engine Firing Order? Why Is It Important?". CarBikeTech, https://web.archive.org/web/20210618123041/https://carbiketech.com/engine-firing-order/. Accessed on May 12, 2021. (Year: 2021).*

* cited by examiner

*Primary Examiner* — Ngoc T Nguyen
(74) *Attorney, Agent, or Firm* — Oblon, McClelland, Maier & Neustadt, L.L.P.

(57) ABSTRACT

A forced-induction device includes a turbine wheel and a partition wall that partitions the interior of a connection pipe into a first passage and a second passage. When viewed in a cross section orthogonal to a rotation axis of the turbine wheel, a line segment connecting the rotation center of the turbine wheel and a downstream end of an inner wall in a flow direction of exhaust gas is a first line segment. A straight line orthogonal to the first line segment and extending from the downstream end in the flow direction of the exhaust gas is a first imaginary line. A straight line passing through a proximal end of the partition wall and orthogonal to an inflow direction of the exhaust gas is a second imaginary line. The distal end of the partition wall is located between the first imaginary line and the second imaginary line.

5 Claims, 4 Drawing Sheets

FORCED-INDUCTION DEVICE

BACKGROUND

1. Field

The present disclosure relates to a forced-induction device.

2. Description of Related Art

Japanese Laid-Open Patent Publication No. 2021-134719 discloses a turbine housing of a forced-induction device. The turbine housing includes a turbine scroll chamber.

In the turbine housing, exhaust gas preferably flow smoothly in the turbine scroll chamber.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a forced-induction device for an internal combustion engine is provided. The internal combustion engine includes a first cylinder and a second cylinder having a different timing of a combustion stroke from the first cylinder, and a first exhaust port connected to the first cylinder and a second exhaust port connected to the second cylinder. The forced-induction device includes a turbine wheel, a turbine housing that accommodates the turbine wheel, and a connection pipe that connects the turbine housing and the internal combustion engine to each other. The connection pipe includes a contact surface that is in contact with the internal combustion engine, a first passage communicating with the first exhaust port, a second passage communicating with the second exhaust port, and a partition wall extending from the contact surface and partitioning an interior of the connection pipe into the first passage and the second passage. The turbine housing includes a scroll passage extending in a circumferential direction of the turbine wheel between an inner wall of the turbine housing and an outer circumferential surface of the turbine wheel. The scroll passage communicates with the first passage and the second passage such that exhaust gas that has passed through the first passage and exhaust gas that has passed through the second passage merge with each other. A specified cross section is defined as a cross-section orthogonal to a rotation axis of the turbine wheel and having a largest cross-sectional flow area of the scroll passage. When the specified cross section is viewed, the following arrangement is achieved: a line segment connecting a rotation center of the turbine wheel and a downstream end of the inner wall in a flow direction of the exhaust gas in the scroll passage is a first line segment; a straight line orthogonal to the first line segment and extending from the downstream end in the flow direction of the exhaust gas in the scroll passage is a first imaginary line; the partition wall includes a proximal end that is an end closer to the contact surface and a distal end opposite to the proximal end; a straight line passing through the proximal end and extending in a direction orthogonal to an inflow direction of the exhaust gas from the internal combustion engine to the connection pipe is a second imaginary line; and the distal end of the partition wall is located between the first imaginary line and the second imaginary line and inside the connection pipe.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, a forced-induction device 10 according to one embodiment will be described.

<Internal Combustion Engine 30>

Figure 1:
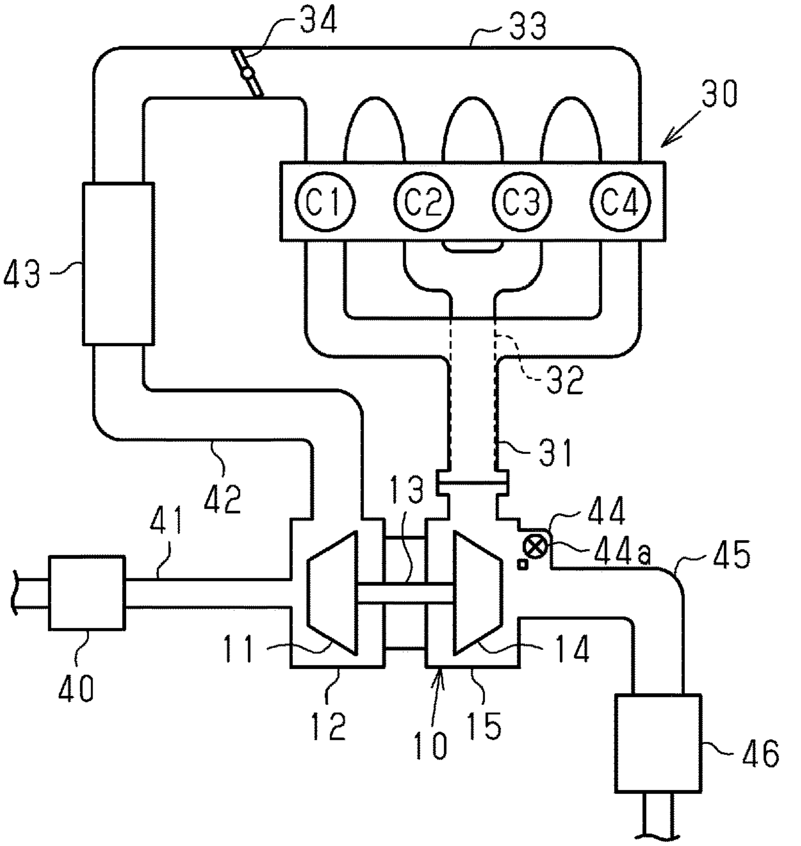
FIG. 1 is a schematic diagram showing an intake and exhaust system of an internal combustion engine including a forced-induction device according to an embodiment.

As shown in FIG. 1, an internal combustion engine 30 includes an intake manifold 33, four cylinders C1, C2, C3, C4, a first exhaust port 31, and a second exhaust port 32.

The intake manifold 33 has four branched passages in a downstream portion, and the branched passages communicate with the cylinders C1 to C4, respectively. A throttle valve 34 is provided upstream of the four branched passages in the intake manifold 33.

The cylinders C1, C2, C3, and C4 are arranged side by side in that order. An intake stroke, a compression stroke, a combustion stroke, and an exhaust stroke occur in each of the cylinders C1 to C4 in that order. When the cylinder C1 is in the intake stroke, the cylinder C2, the cylinder C3, and the cylinder C4 are in the compression stroke, the exhaust stroke, and the combustion stroke, respectively. When the cylinder C1 is in the compression stroke, the cylinder C2, the cylinder C3, and the cylinder C4 are in the combustion stroke, the intake stroke, and the exhaust stroke, respectively. When the cylinder C1 is in the combustion stroke, the cylinder C2, the cylinder C3, and the cylinder C4 are in the exhaust stroke, the compression stroke, and the intake stroke, respectively. When the cylinder C1 is in the exhaust stroke, the cylinder C2, the cylinder C3, and the cylinder C4 are in the intake stroke, the combustion stroke, and the compression stroke, respectively.

The cylinders C1 and C4 are first cylinders that communicate with the first exhaust port 31. The cylinders C2 and C3 are second cylinders that communicate with the second exhaust port 32. As described above, the first cylinders and the second cylinders are different in the timing of the combustion stroke. The cylinders C1 and C4 may be referred to as an N1 cylinder and an N3 cylinder, respectively. The cylinders C2 and C3 may be referred to as an N4 cylinder and an N2 cylinder, respectively. The combustion stroke occurs in the order of the cylinder C1, the cylinder C3, the cylinder C4 and the cylinder C2. That is, the combustion stroke occurs in the order of the N1 cylinder, the N2 cylinder, the N3 cylinder, and the N4 cylinder.

<Intake and Exhaust System of Internal Combustion Engine 30>

An outline of an intake and exhaust system of the internal combustion engine 30 will be described with reference to FIGS. 1 and 2.

As shown in FIG. 1, the intake and exhaust system of the internal combustion engine 30 includes an air cleaner 40, a first intake passage 41, the forced-induction device 10, a second intake passage 42, an intercooler 43, an exhaust passage 45, and a three-way catalyst 46.

The air cleaner 40 is connected to the forced-induction device 10 by the first intake passage 41. The forced-induction device 10 is connected to the intercooler 43 by the second intake passage 42. The intercooler 43 is connected to the intake manifold 33 of the internal combustion engine 30. The first exhaust port 31 and the second exhaust port 32 are connected to the forced-induction device 10.

Figure 2:
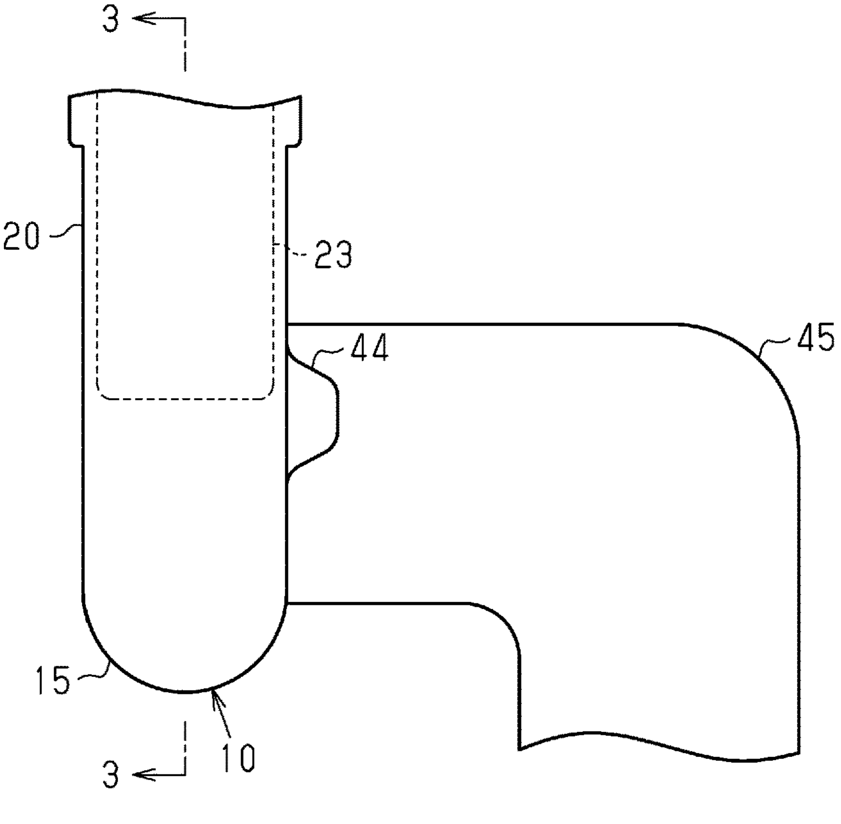
FIG. 2 is a side view of the forced-induction device of FIG. 1.

As shown in FIGS. 1 and 2, the forced-induction device 10 is connected to the exhaust passage 45. The three-way catalyst 46 is connected to the downstream side of the exhaust passage 45.

The intake air flows into the compressor housing 12 of the forced-induction device 10 through the air cleaner 40 and the first intake passage 41. The intake air is compressed by a compressor wheel 11 provided in the compressor housing 12. The compressed intake air passes through the second intake passage 42 and the intercooler 43 and flows into the intake manifold 33.

The exhaust gas discharged from the internal combustion engine 30 passes through the first exhaust port 31 or the second exhaust port 32 and flows into the turbine housing 15 of the forced-induction device 10. The exhaust gas flowing into the turbine housing 15 rotates the turbine wheel 14 provided in the turbine housing 15. The exhaust gas flowing into the turbine housing 15 passes through the exhaust passage 45 and the three-way catalyst 46 and is discharged to the outside.

<Forced-Induction Device 10>

As shown in FIGS. 1 and 2, the forced-induction device 10 includes the compressor wheel 11, the compressor housing 12, a coupling shaft 13, the turbine wheel 14, the turbine housing 15, and a connection pipe 20.

The compressor housing 12 accommodates the compressor wheel 11. The first intake passage 41 and the second intake passage 42 are connected to the compressor housing 12.

Figure 3:
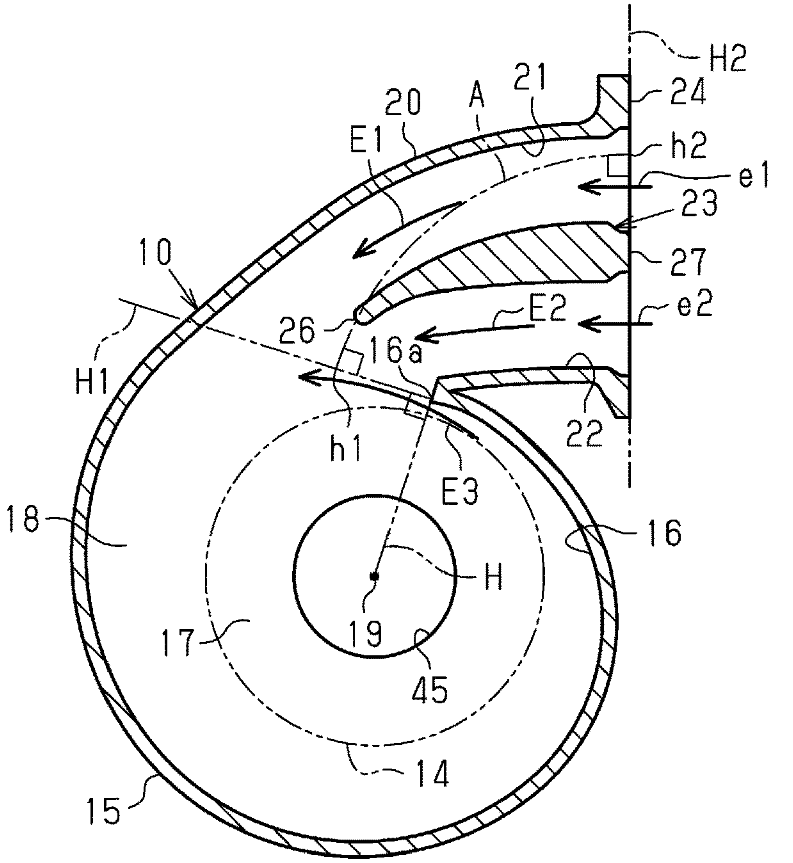
FIG. 3 is a cross-sectional view taken along line 3-3 of FIG. 2.

As shown in FIG. 3, the connection pipe 20 includes a first passage 21, a second passage 22, a partition wall 23, and a contact surface 24. The connection pipe 20 connects the turbine housing 15 and the internal combustion engine 30 to each other. The connection pipe 20 is in contact with the internal combustion engine 30 at the contact surface 24. The connection pipe 20 is curved between the turbine housing 15 and the internal combustion engine 30. In the vicinity of the contact surface 24, the connection pipe 20 extends in a direction perpendicular to the contact surface 24. The partition wall 23 divides the inside of the connection pipe 20 into the first passage 21 and the second passage 22. The first passage 21 and the second passage 22 communicate with the first exhaust port 31 and the second exhaust port 32, respectively. FIG. 3 shows a specified cross section which is a cross section orthogonal to the rotation axis of the turbine wheel 14 and in which the cross-sectional flow area of a scroll passage 18 is the largest.

Figure 4:
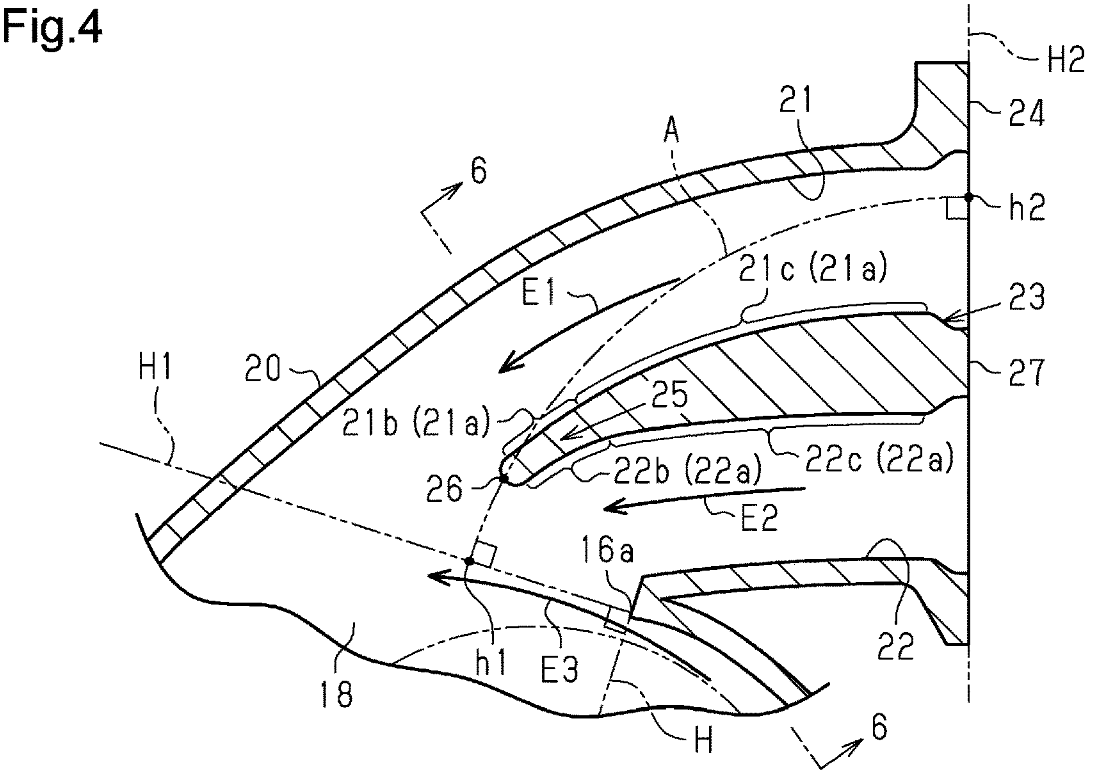
FIG. 4 is an enlarged cross-sectional view of the vicinity of a connection pipe of the forced-induction device of FIG. 3.

As shown in FIGS. 3 and 4, when a flow direction E1 of exhaust gas in the first passage 21 and a flow direction E2 of exhaust gas in the second passage 22 are defined as flow directions of exhaust gas in the connection pipe 20, the partition wall 23 extends from the contact surface 24 in the flow direction of the exhaust gas in the connection pipe 20.

The inner surface of the first passage 21 includes a first inner surface 21*a* that defines the outer shape of the partition wall 23. The inner surface of the second passage 22 includes a second inner surface 22*a* that defines the outer shape of the partition wall 23. The first inner surface 21*a* includes a first downstream inner surface 21*b* connected to a distal end 26 of the partition wall 23 and a first upstream inner surface 21*c* connected to the first downstream inner surface 21*b* and extending toward the contact surface 24. The second inner surface 22*a* includes a second downstream inner surface 22*b* connected to the distal end 26 of the partition wall 23 and a second upstream inner surface 22*c* connected to the second downstream inner surface 22*b* and extending toward the contact surface 24.

Figure 6:
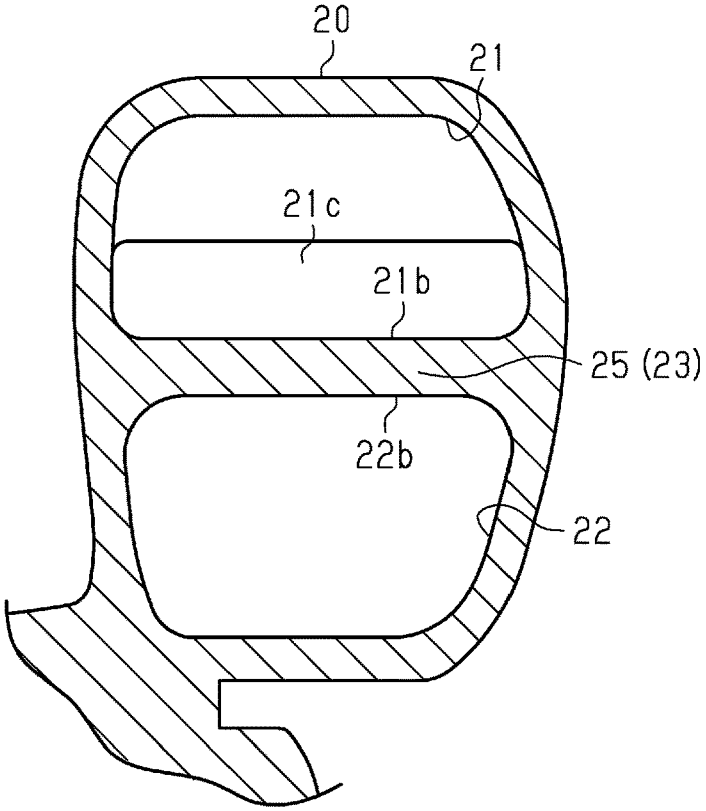
FIG. 6 is a cross-sectional view taken along line 6-6 of FIG. 4.

As shown in FIGS. 4 and 6, the first downstream inner surface 21*b* and the second downstream inner surface 22*b* are flat surfaces and are parallel to each other. The first upstream inner surface 21*c* is inclined with respect to the second upstream inner surface 22*c* such that the distance between the first upstream inner surface 21*c* and the second upstream inner surface 22*c* increases toward the contact surface 24.

A portion of the partition wall 23 sandwiched between the first downstream inner surface 21*b* and the second downstream inner surface 22*b* is referred to as a downstream portion 25. Portions of the first passage 21 and the second passage 22 adjacent to each other with the downstream portion 25 interposed therebetween have the same cross-sectional flow area.

As shown in FIG. 3, the turbine housing 15 has a substantially circular shape in a cross-sectional view. The turbine housing 15 accommodates the turbine wheel 14, which has a substantially circular shape in a cross-sectional view. The turbine wheel 14 has a rotation center 19. An imaginary line passing through the rotation center 19 and extending in a direction perpendicular to the cross-section shown in FIG. 3 is a rotation axis.

As shown in FIG. 1, the compressor wheel 11 and the turbine wheel 14 are coupled to each other by the coupling shaft 13.

As shown in FIG. 3, the turbine housing 15 includes the scroll passage 18, which extends in the circumferential direction of the turbine wheel 14 between an inner wall 16 of the turbine housing 15 and an outer circumferential surface 17 of the turbine wheel 14. The scroll passage 18 is a passage that communicates with the first passage 21 and the second passage 22 of the connection pipe 20, and is a passage in which the exhaust gas that has passed through the first passage 21 and the exhaust gas that has passed through the second passage 22 merge with each other.

As shown in FIGS. 1 and 2, a bypass passage 44 is provided in the turbine housing 15. The bypass passage 44 extends from the turbine housing 15 to the exhaust passage 45. A wastegate valve 44*a* is provided in the bypass passage 44. Exhaust gas bypasses the turbine wheel 14 by flowing through the bypass passage 44.

As shown in FIG. 3, a line segment connecting the rotation center 19 of the turbine wheel 14 and a downstream end 16*a* of the inner wall 16 in a flow direction E3 of the exhaust gas in the scroll passage 18 is defined as a first line segment H. A straight line orthogonal to the first line segment H and extending from the downstream end 16*a* along the flow of exhaust gas in the scroll passage 18 is defined as a first imaginary line H1. An end of the partition wall 23 near the contact surface 24 is referred to as a proximal end 27. The directions in which exhaust gas flows from the internal combustion engine 30 into the connection pipe 20 are referred to as inflow directions e1 and e2. A straight line passing through the proximal end 27 and extending in a direction orthogonal to the inflow directions e1, e2 is defined as a second imaginary line H2.

Figure 5:
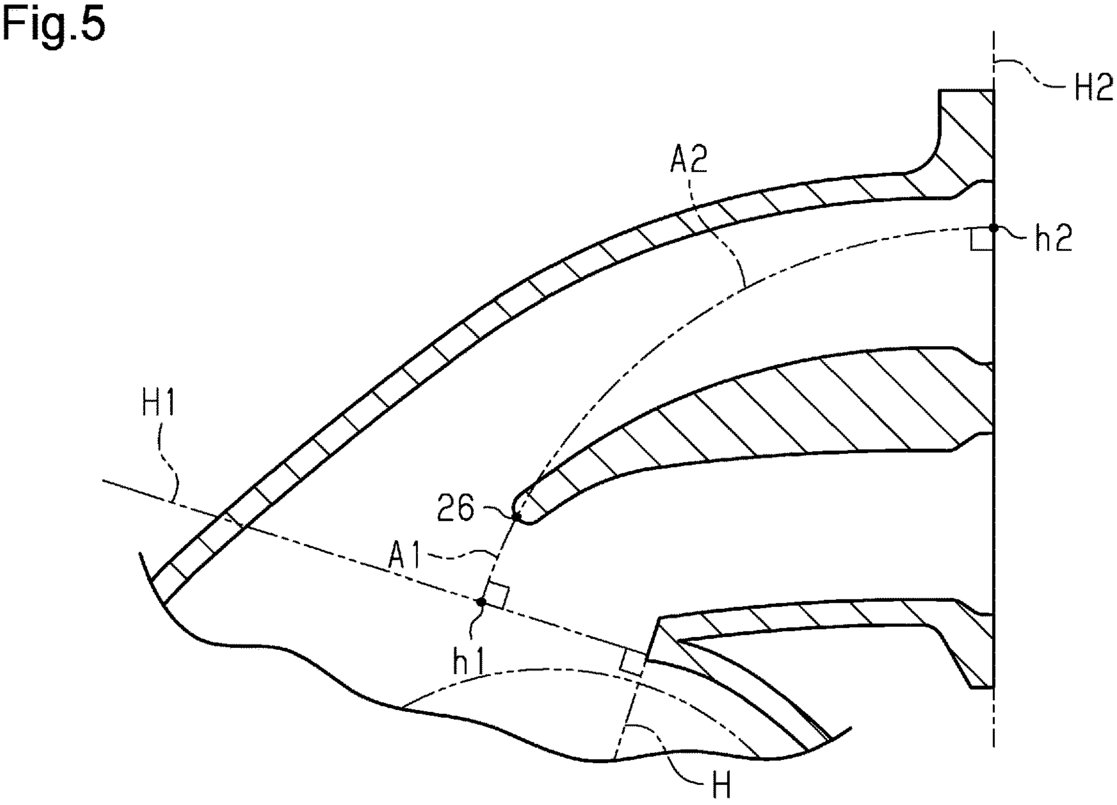
FIG. 5 is an enlarged cross-sectional view of the vicinity of the connection pipe of the forced-induction device of FIG. 3.

As shown in FIGS. 3 to 5, the distal end 26 of the partition wall 23 is located between the first imaginary line H1 and the second imaginary line H2 inside the connection pipe 20. A shortest arc A is an arc having the shortest length among arcs that pass through the distal end 26 of the partition wall 23 and are orthogonal to the first imaginary line H1 and the second imaginary line H2 at a first intersection h1 on the first imaginary line H1 and a second intersection h2 on the second imaginary line H2. In this case, a distance A1 between the first intersection h1 and the distal end 26 of the partition wall 23 along the shortest arc A is shorter than a distance A2 between the second intersection h2 and the distal end 26 of the partition wall 23 along the shortest arc A. The distance A1 is the length of the shortest arc A between the first intersection h1 and the distal end 26 of the partition wall 23. The distance A2 is the length of the shortest arc A between the second intersection h2 and the distal end 26 of the partition wall 23.

Operation of this embodiment will be described.

Since exhaust gas is intermittently discharged from the internal combustion engine 30 to the first exhaust port 31 and the second exhaust port 32, the pressure in the first exhaust port 31 and the pressure in the second exhaust port 32 periodically change to generate pressure pulsation. Further, since the timings at which the exhaust gas is discharged from the internal combustion engine 30 to the first exhaust port 31 and the second exhaust port 32 are different from each other, a difference occurs between the pressure in the first exhaust port 31 and the pressure in the second exhaust port 32 at the same point in time. Therefore, when the pressure in the first exhaust port 31 is higher than the pressure in the second exhaust port 32, the exhaust gas discharged from the first exhaust port 31 to the connection pipe 20 may flow back to the second exhaust port 32. When the pressure in the second exhaust port 32 is higher than the pressure in the first exhaust port 31, the exhaust gas discharged from the second exhaust port 32 to the connection pipe 20 may flow back to the first exhaust port 31.

According to the above configuration, the connection pipe 20 includes the partition wall 23, which partitions the inside of the connection pipe 20 into the first passage 21 communicating with the first exhaust port 31 and the second passage 22 communicating with the second exhaust port 32. Therefore, a backflow of the exhaust gas from the first exhaust port 31 to the second exhaust port 32 and a backflow of the exhaust gas from the second exhaust port 32 to the first exhaust port 31 are less likely to occur.

Figure 7:
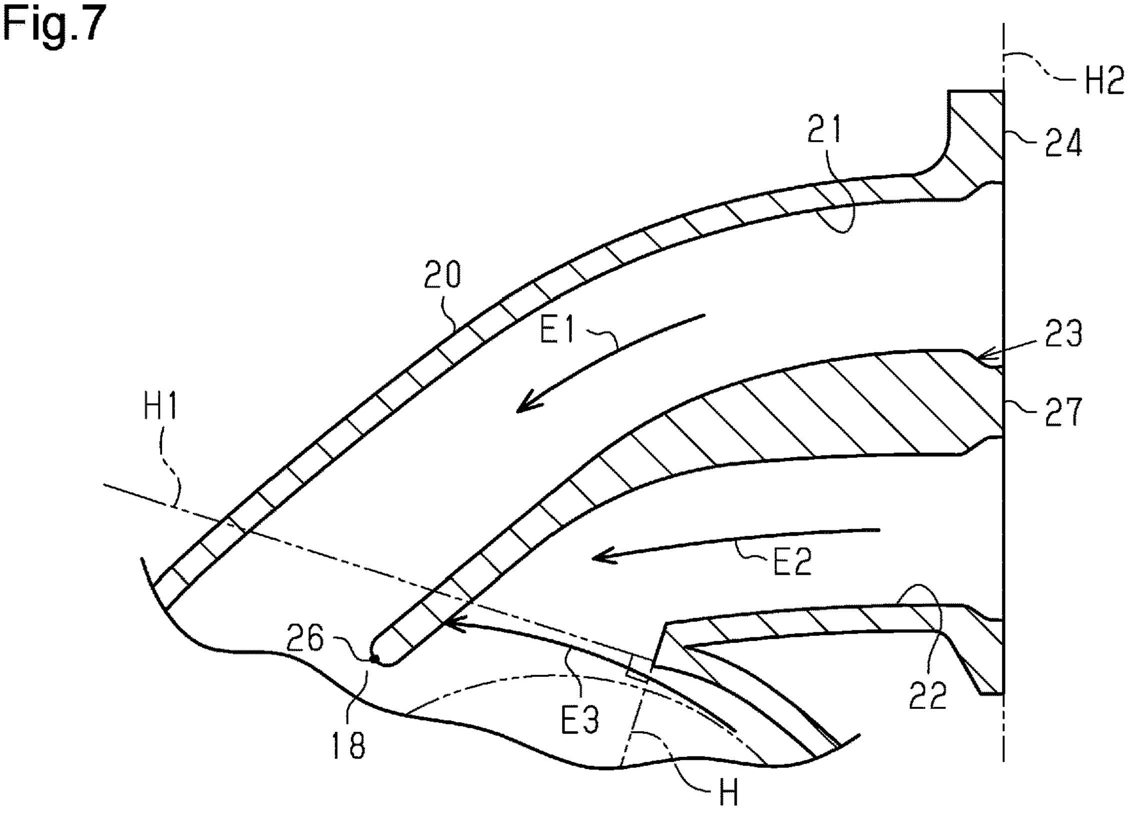
FIG. 7 is an enlarged cross-sectional view of the vicinity of the connection pipe in a case in which a partition wall of the forced-induction device is lengthened.

As illustrated in FIG. 7, as the position of the distal end 26 of the partition wall 23 is closer to the scroll passage 18, the exhaust gas flowing through the first passage 21 and the second passage 22 more easily reaches the scroll passage 18, and thus the effect of suppressing the backflow of the exhaust gas described above is increased. However, when the distal end 26 protrudes to the scroll passage 18 beyond the first imaginary line H1, the exhaust gas circulating in the scroll passage 18 may collide with the partition wall 23. This may reduce the pressure and the flow rate of the exhaust gas circulating in the scroll passage 18.

According to the above configuration, since the position of the distal end 26 of the partition wall 23 is defined such that the distal end 26 is positioned between the first imaginary line H1 and the second imaginary line H2, the exhaust gas flowing through the scroll passage 18 is unlikely to collide with the partition wall 23.

The present embodiment achieves the following advantages.

(1) The distal end 26 of the partition wall 23 is located between the first imaginary line H1 and the second imaginary line H2 inside the connection pipe 20.

According to such a configuration, since the forced-induction device 10 includes the partition wall 23, not only the exhaust gas can smoothly flow in the scroll passage 18 but also backflow of the exhaust gas due to the pressure pulsation is unlikely to occur. In addition, since the distal end 26 of the partition wall 23 is positioned between the first imaginary line H1 and the second imaginary line H2 inside the connection pipe 20, the exhaust gas inside the scroll passage 18 is unlikely to collide with the partition wall 23. Therefore, the exhaust gas easily flows smoothly in the scroll passage 18.

(2) The distance A1 between the first intersection h1 and the distal end 26 of the partition wall 23 along the shortest arc A is shorter than the distance A2 between the second intersection h2 and the distal end 26 of the partition wall 23 along the shortest arc A.

Figure 8:
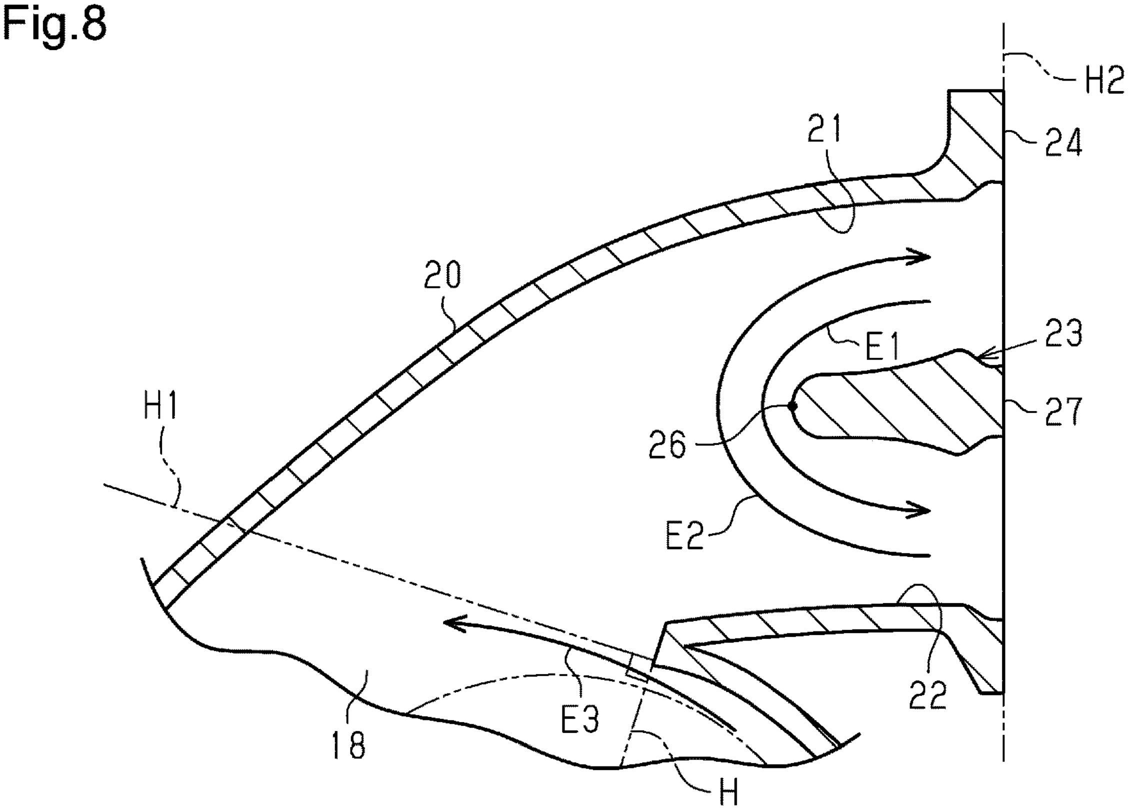
FIG. 8 is an enlarged cross-sectional view of the vicinity of the connection pipe in a case in which the partition wall of the forced-induction device is shortened.

As shown in FIG. 8, when the length of the partition wall 23 is short, the exhaust gas discharged from the first passage 21 and the second passage 22 does not easily flow to the scroll passage 18, and thus the above-described backflow of exhaust gas is likely to occur.

In this regard, according to the above-described configuration, it is possible to provide a configuration in which the distal end 26 of the partition wall 23 is close to the scroll passage 18 while allowing the distal end 26 of the partition wall 23 to be separated from the first imaginary line H1 toward the connection pipe 20. Therefore, it is possible to effectively exhibit the function of suppressing collision of exhaust gas flowing through the scroll passage 18 with the partition wall 23 and the function of suppressing backflow of exhaust gas from the first passage 21 to the second passage 22 and backflow of exhaust gas from the second passage 22 to the first passage 21.

(3) The engine 30 has the cylinders C1, C2, C3, and C4 in which combustion stroke occurs in the order of the cylinders C1, C3, C4, and C2. The first cylinders include the cylinder C1 and the cylinder C4. The second cylinders include the cylinder C2 and the cylinder C3.

Unlike the above configuration, for example, in a configuration in which the first cylinders are the cylinders C1 and C3 and the second cylinders are the cylinders C4 and C2, the following problem occurs. Since exhaust gas is continuously introduced into the first exhaust port 31 from the cylinders C1 and C3 in a certain period of time, the pressure of the exhaust gas in the first passage 21 becomes higher than the pressure of the exhaust gas in the second passage 22, and the pressure difference between the passages 21 and 22 also becomes large. Similarly, since exhaust gas is continuously introduced into the second exhaust port 32 from the cylinders C4 and C2 in another period, the pressure of the exhaust gas in the second passage 22 becomes higher than the pressure of the exhaust gas in the first passage 21, and the pressure difference between the passages 21 and 22 also becomes large. Therefore, the above-described backflow of the exhaust gas is likely to occur.

In this regard, according to the above-described configuration, since the exhaust gas alternately flows through the first passage 21 and the second passage 22, the above-described backflow of exhaust gas is suppressed. Therefore, the exhaust gas easily flows from the first passage 21 and the second passage 22 to the scroll passage 18.

(4) The cross-sectional flow areas of the portions of the first passage 21 and the second passage 22 that are adjacent to each other with the downstream portion 25 interposed therebetween are equal to each other.

According to the above-described configuration, a difference is unlikely to occur between the force with which the exhaust gas flowing from the first passage 21 into the scroll passage 18 contributes to rotation of the turbine wheel 14 and the force with which the exhaust gas flowing from the second passage 22 into the scroll passage 18 contributes to rotation of the turbine wheel 14. Therefore, the speed at which the turbine wheel 14 rotates tends to be constant. Therefore, pulsation of the boost pressure is unlikely to occur.

<Modifications>

The present embodiment may be modified as follows. The present embodiment and the following modifications can be implemented in combination with each other as long as there is no technical contradiction.

The cross-sectional flow area of the first passage 21 and the cross-sectional flow area of the second passage 22, which are adjacent to each other with the downstream portion 25 interposed therebetween, may be different from each other.

In this description, when the cross-sectional flow area of the first passage 21 is represented by S1 and the cross-sectional flow area of the second passage 22 is represented by S2, the case in which S1 and S2 are equal to each other includes the following case. That is, in addition to the case in which S1 and S2 are completely equal to each other, a case in which $0.9 \leq S1/S2 \leq 1.1$ is satisfied is included.

The first upstream inner surface 21*c* and the second upstream inner surface 22*c* may be parallel to each other.

In the present specification, "parallel" is not limited to parallel in a strict sense. That is, a case in which the second downstream inner surface 22*b* is inclined with respect to the first downstream inner surface 21*b* within a range in which the flow direction of the exhaust gas flowing from the first passage 21 into the scroll passage 18 and the flow direction of the exhaust gas flowing from the second passage 22 into the scroll passage 18 can be regarded as parallel is also included in "parallel" in the present specification.

The distance A1 between the first intersection h1 on the shortest arc A and the distal end 26 of the partition wall 23 may be equal to the distance A2 between the second intersection h2 on the shortest arc A and the distal end 26 of the partition wall 23. The distance A1 between the first intersection h1 on the shortest arc A and the distal end 26 of the partition wall 23 may be longer than the distance A2 between the second intersection h2 on the shortest arc A and the distal end 26 of the partition wall 23.

The distal end 26 of the partition wall 23 may be positioned on the first imaginary line H1. According to such a configuration, backflow of the exhaust gas from the first exhaust port 31 to the second exhaust port 32 and backflow of the exhaust gas from the second exhaust port 32 to the first exhaust port 31 are more unlikely to occur.

In the present specification, the "distal end 26 of the partition wall 23" is not only a distal end in a strict sense, but also a portion having a certain size including the distal end 26 and a peripheral portion of the distal end 26.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A forced-induction device for an internal combustion engine, wherein the internal combustion engine includes:

a first cylinder and a second cylinder having a different timing of a combustion stroke from the first cylinder; and a first exhaust port connected to the first cylinder and a second exhaust port connected to the second cylinder, the forced-induction device comprises:

a turbine wheel;

a turbine housing that accommodates the turbine wheel; and a connection pipe that connects the turbine housing and the internal combustion engine to each other, the connection pipe includes:

a contact surface that is in contact with the internal combustion engine;

a first passage communicating with the first exhaust port;

a second passage communicating with the second exhaust port; and a partition wall extending from the contact surface and partitioning an interior of the connection pipe into the first passage and the second passage, the turbine housing includes a scroll passage extending in a circumferential direction of the turbine wheel between an inner wall of the turbine housing and an outer circumferential surface of the turbine wheel, the scroll passage communicates with the first passage and the second passage such that exhaust gas that has passed through the first passage and exhaust gas that has passed through the second passage merge with each other, a specified cross section is defined as a cross-section orthogonal to a rotation axis of the turbine wheel and having a largest cross-sectional flow area of the scroll passage, and when the specified cross section is viewed a line segment connecting a rotation center of the turbine wheel and a downstream end of the inner wall in a flow direction of the exhaust gas in the scroll passage is a first line segment, a straight line orthogonal to the first line segment and extending from the downstream end in the flow direction of the exhaust gas in the scroll passage is a first imaginary line, the partition wall includes a proximal end that is an end closer to the contact surface and a distal end opposite to the proximal end, a straight line passing through the proximal end and extending in a direction orthogonal to an inflow direction of the exhaust gas from the internal combustion engine to the connection pipe is a second imaginary line, the distal end of the partition wall is located between the first imaginary line and the second imaginary line and inside the connection pipe, a shortest arc is defined as an arc having a shortest length among arcs that pass through the distal end of the partition wall and are orthogonal to the first imaginary line and the second imaginary line respectively at a first intersection on the first imaginary line and a second intersection on the second imaginary line, and a distance between the first intersection and the distal end of the partition wall along the shortest arc is shorter than a distance between the second intersection and the distal end of the partition wall along the shortest arc.

2. The forced-induction device according to claim 1, wherein the internal combustion engine includes four cylinders, the first cylinder is one of a cylinder in which a combustion stroke occurs first and a cylinder in which the combustion stroke occurs third, and the second cylinder is one of a cylinder in which the combustion stroke occurs second and a cylinder in which the combustion stroke occurs fourth.

3. The forced-induction device according to claim 1, wherein an inner surface of the first passage includes a first inner surface defining an outer shape of the partition wall, the first inner surface including a first downstream inner surface connected to the distal end of the partition wall, an inner surface of the second passage includes a second inner surface defining the outer shape of the partition wall, the second inner surface including a second downstream inner surface connected to the distal end of the partition wall, a portion of the partition wall that has an outer shape defined by the first downstream inner surface and the second downstream inner surface is a downstream portion, and when the specified cross section is viewed, cross-sectional flow areas of portions of the first passage and the second passage that are adjacent to each other with the downstream portion interposed therebetween are equal to each other.

4. The forced-induction device according to claim 3, wherein the first inner surface includes a first upstream inner surface connected to the first downstream inner surface and extending toward the contact surface of the connection pipe, the second inner surface includes a second upstream inner surface connected to the second downstream inner surface and extending toward the contact surface of the connection pipe, and when the specified cross section is viewed the first downstream inner surface and the second downstream inner surface are parallel to each other, and the first upstream inner surface is inclined with respect to the second upstream inner surface such that a distance between the first upstream inner surface and the second upstream inner surface increases toward the contact surface.

5. A forced-induction device for an internal combustion engine, wherein the internal combustion engine includes:

a first cylinder and a second cylinder having a different timing of a combustion stroke from the first cylinder; and a first exhaust port connected to the first cylinder and a second exhaust port connected to the second cylinder, the forced-induction device comprises:

a turbine wheel;

a turbine housing that accommodates the turbine wheel; and a connection pipe that connects the turbine housing and the internal combustion engine to each other, the connection pipe includes:

a contact surface that is in contact with the internal combustion engine;

a first passage communicating with the first exhaust port;

a second passage communicating with the second exhaust port; and a partition wall extending from the contact surface and partitioning an interior of the connection pipe into the first passage and the second passage, the turbine housing includes a scroll passage extending in a circumferential direction of the turbine wheel between an inner wall of the turbine housing and an outer circumferential surface of the turbine wheel, the scroll passage communicates with the first passage and the second passage such that exhaust gas that has passed through the first passage and exhaust gas that has passed through the second passage merge with each other, a specified cross section is defined as a cross-section orthogonal to a rotation axis of the turbine wheel and having a largest cross-sectional flow area of the scroll passage and, when the specified cross section is viewed a line segment connecting a rotation center of the turbine wheel and a downstream end of the inner wall in a flow direction of the exhaust gas in the scroll passage is a first line segment, a straight line orthogonal to the first line segment and extending from the downstream end in the flow direction of the exhaust gas in the scroll passage is a first imaginary line, the partition wall includes a proximal end that is an end closer to the contact surface and a distal end opposite to the proximal end, a straight line passing through the proximal end and extending in a direction orthogonal to an inflow direction of the exhaust gas from the internal combustion engine to the connection pipe is a second imaginary line, and the distal end of the partition wall is located between the first imaginary line and the second imaginary line and inside the connection pipe, an inner surface of the first passage includes a first inner surface defining an outer shape of the partition wall, the first inner surface including a first downstream inner surface connected to the distal end of the partition wall, an inner surface of the second passage includes a second inner surface defining the outer shape of the partition wall, the second inner surface including a second downstream inner surface connected to the distal end of the partition wall, a portion of the partition wall that has an outer shape defined by the first downstream inner surface and the second downstream inner surface is a downstream portion and, when the specified cross section is viewed, cross-sectional flow areas of portions of the first passage and the second passage that are adjacent to each other with the downstream portion interposed therebetween are equal to each other, the first inner surface includes a first upstream inner surface connected to the first downstream inner surface and extending toward the contact surface of the connection pipe, the second inner surface includes a second upstream inner surface connected to the second downstream inner surface and extending toward the contact surface of the connection pipe, and when the specified cross section is viewed the first downstream inner surface and the second downstream inner surface are parallel to each other, and the first upstream inner surface is inclined with respect to the second upstream inner surface such that a distance between the first upstream inner surface and the second upstream inner surface increases toward the contact surface.

* * * * *